Aug. 6, 1968   J. V. WISEMAN ET AL   3,395,906
ROTARY TRONA CALCINER
Filed April 13, 1966
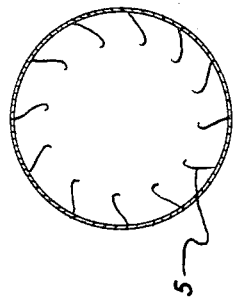
FIG. #2
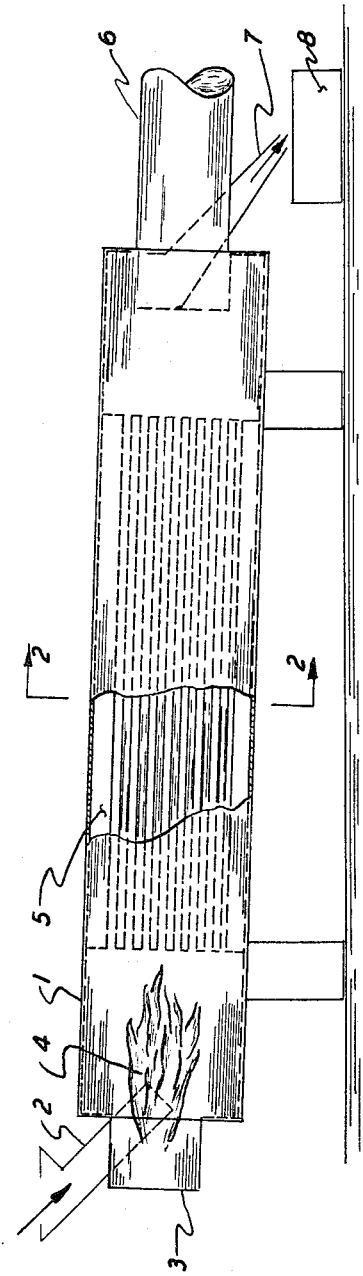
FIG. #1
INVENTOR.
HENRY D. HELLMERS
JAMES V. WISEMAN
BY Edwin H. Baker
ATTORNEY United States Patent Office 3,395,906
Patented Aug. 6, 1968

3,395,906
ROTARY TRONA CALCINER
James V. Wiseman, Lafayette, and Henry D. Hellmers, Westend, Calif., assignors to Stauffer Chemical Company, New York, N.Y., a corporation of Delaware
Filed Apr. 13, 1966, Ser. No. 542,994
1 Claim. (Cl. 263—33)

ABSTRACT OF THE DISCLOSURE

A calciner for calcining trona ore having an elongated, rotatable metal shell, mounted in a canted position with respect to the horizontal, which is interiorly divided into the following three sections: (A) a smooth surfaced, cylindrically shaped combustion section which is located at the inlet end of the calciner (B) a centrally located cascading section having lifters attached to the interior surface of the metal shell (C) a smooth surfaced settling section located adjacent the cascading section at the exit end of the shell. The calciner has an inlet shaft extended into the combustion section for supplying trona ore, a burner located at the inlet of the shell and apparatus for rotating the metal shell.

---

The present invention relates to a new and improved calciner for calcining crude trona. Trona is a naturally occurring ore in the area of Green River, Wyo., and chemically is a mixture of sodium carbonate-sodium bicarbonate of the formula $Na_2CO_3 \cdot NaHCO_3 \cdot 2H_2O$. In the manufacture of soda ash from said ore by the so-called monohydrate process, the trona is dry-mined and crushed to a size which can then be readily calcined. In the calcination of the ore, the bicarbonate content of the trona is converted to sodium carbonate and the water of hydration is driven off to yield a crude sodium carbonate. This crude sodium carbonate is then dissolved to yield an aqueous solution of sodium carbonate which in turn is clarified and filtered to remove the shale and other insoluble impurities in the trona ore. This resulting aqueous sodium carbonate solution which is free of insoluble impurities is then concentrated to precipitate sodium carbonate monohydrate crystals which are then dried to yield a substantially pure dense soda ash.

The present invention concerns the initial operation in the monohydrate process for preparing dense soda ash from trona and thus the initial process operations will be discussed in more detail.

In mining the trona ore, any dry mining technique can be utilized. After mining, the trona ore must be sized to allow economical calcining. The particular means employed to pulverize the ore can be varied widely as such means are well known in the art. Preferably, the pulverizing of the ore is carried out in a single operation using a hammer mill, impact mill or the like. The resultant particle size of the trona ore may be varied widely since the residence time in the calciner and the calcination temperature are the determining factors in effecting complete conversion of the trona to crude sodium carbonate. Generally speaking, however, the trona is usually crushed to a particle size of less than one inch. Preferably, the trona ore is crushed to all minus ¼ inch. This crushed ore is then delivered to a calciner which subjects the crushed ore to temperatures between about 250° F. and 800° F. to convert the trona completely to crude sodium carbonate.

Previously, calciners for converting trona to crude soda ash generally consisted of a rotating canted cylinder through which the trona ore advance. Hot gases from a separate fire box or combustion chamber were passed through said rotating canted cylinder countercurrent to the advancing ore in order to effect the calcination. In these type calciners, less efficient use of heat and less throughput are evident when compared to the instant invention. For example, in calcining trona the bigger the particle of trona is, the longer must be the retention time in the calciner to effect complete conversion. The present invention does just that since the trona particles having less mass are not retained in the calciner as long as the particles of higher mass which obviously increases the throughput or capacity of the calciner.

FIGURE 1 of the drawing shows the overall construction of the calciner.

FIGURE 2 of the drawing shows a section of the calciner taken on the line 2—2 of FIGURE 1.

As shown in FIGURE 1, the rotatable metal shell 1 of the calciner is canted with the crushed trona ore inlet 2 positioned at the higher end of the calciner shell to deliver crushed trona ore directly to the interior of the calciner. A burner 3 is positioned at the entrance of the calciner and in operation produces a flame 4 into the interior of the calciner. In the central portion of the calciner, a plurality of lifters 5 are attached to the interior of the calciner shell 1 which during operation actually lifts the trona ore working its way through the calciner shell 1 and cascades said ore down through the hot gases flowing through said calciner. Although the lifters 5 are depicted in the drawing as being rather elongated scoops along the major axis of the calciner shell fixedly attached thereto, they may take any particular form as long as they carry trona ore to the top of the calciner shell and then cascade the same through said hot gases and do not unduly delay the residence time of the ore in the calciner. As can be seen from the drawing, the lifters 5 are contrally positioned in the calciner shell 1. This is done for very special reasons which are critical features of the invention. At the entrance end of the calciner, the flame 4 from burner 3 is within the calciner and uses the calciner shell as a firebox. If lifters 5 were present in the area of the flame 4, the cascading trona ore would either completely extinguish the flame or at least prevent complete combustion which would drastically hinder the economics of the operation.

At the exit end of the calciner, no lifters are present to allow substantially all of the product crude sodium carbonate to settle from the hot gas stream save but the finest of materials which is carried with the hot gases out of the calciner via a conveying means 6 to a suitable scrubber not shown. The crude sodium carbonate exiting the calciner is carried by any suitable conveyor means 7 to either storage 8 or further processing.

As is evident from the foregoing description, the trona ore enters the higher end of the canted calciner in proximity of the burner which projects a flame directly into the calciner. No lifters are present in this feed end of the calciner for the length required for complete fuel combustion to maximize fuel efficiency. The trona ore in this portion of the calciner tends to flow like water along the lower portion of the rotating calciner shell due to the evolution of $CO_2$ and steam from the ore which tends to fluidize the ore. This initial calcining in the direct fired portion of the calciner performs two important functions: (1) it maximizes the fuel efficiency since it utilizes substantially all of the radiation, conduction and convection heating possible in calcining the ore whereas calciners utilizing separate fire boxes or combustion chambers lose substantial heating values by not utilizing the radiant heat of the flame and by conduction through said fire box, (2) the fluidized trona ore being calcined in this entrance portion of the calciner extracts heat from the calciner shell which increases the life of the calciner by maintaining a substantially lower shell temperature. When the partially calcined trona ore reaches the central area of the calciner containing the lifters, it is carried to the top of the rotating shell and cascades down through the hot gases from the combustion which flow through the calciner. As the trona particles cascade down through the flowing gases, a velocity along the major axis of the calciner is imparted to the particles during freefall which is inversely proportional to their mass. This imparted velocity is due to the hot gas flow and therefore decreases the residence time within the calciner for smaller particles which do not require as long a residence time as the larger particles to be completely calcined to crude soda ash. After passing out of the central portion of the calciner, the calcined ore gravitates to the lower section of the rotating calciner shell from which it is removed to storage or further processing.

The dimensions of such a calciner can vary widely as would be obvious to one skilled in the art and would depend on such factors as calcining temperature, particle size of the trona ore fed to the calciner, slope of the calciner, velocity of gases within the calciner, and throughput desired. However, a typical installation would be fed a trona ore crushed in a hammer mill to all less than ¼ inch which would result in 60 to 65% of the milled ore being minus 20 mesh. This ore would be fed at the rate of 1,300 lbs./hr. into a 5 foot diameter calciner which was 36 ft. long. Lifters which were 18 feet long were installed 10 feet from the entrance of the calciner. Natural gas would be fed to the burner at the rate of 9,900 cu. ft./hr. which would be completely consumed in the first 10 feet of the calciner. This combustion caused a gas velocity of approximately 4.8 ft./sec. through the calciner. The exit gas temperature on such a run was 385° F. while the product temperature was 330° F. The resulting product contained no bicarbonate values and thus was completely calcined. The smaller particles of ore were flash calcined (short residence time) while the larger particle sizes were calcined in the normal manner.

We claim:

1. A calciner capable of converting sized trona ore, $Na_2CO_3 \cdot NaHCO_3 \cdot 2H_2O$, to crude sodium carbonate with a minimum of heat loss utilizing both flash and regular calcination comprising:

(a) an elongated, rotatable metal shell mounted in a canted position with respect to the horizontal to effect movement of the input trona ore through said shell by gravity during rotation,
(b) means for rotating said shell about its major axis,
(c) said shell being interiorly divided in three distinct sections—a combustion section, a cascading section and a settling section,
(d) said combustion section being located at the inlet end of the calciner shell where the interior of the calciner shell is substantially cylindrically shaped and smooth,
(e) a trona ore inlet means which supplies said ore to the interior of said combustion zone at or near the inlet end of the calciner shell,
(f) a burner positioned substantially at the inlet end of the calciner shell so that the flame from said burner is substantially entirely within said combustion zone during its complete combustion,
(g) lifters fixedly attached to the interior of the calciner shell in the cascading section which is centrally disposed in the calciner adjacent the combustion section, said lifters lifting the trona ore by the rotation of the calciner shell and cascading said ore down through hot gases flowing through said shell,
(h) said settling section being located adjacent said cascading section and terminating with the exit end of the calciner shell, the interior of the calciner shell in the settling section being essentially smooth so as to allow substantially all of the now calcined trona ore to settle from the hot gas stream for removal from the calciner.

References Cited

UNITED STATES PATENTS

| | | | |
|---|---|---|---|
| 708,602 | 9/1902 | Welch | 263—33 |
| 765,666 | 7/1904 | Hecking | 263—33 X |
| 1,912,810 | 6/1933 | Wechter | 263—32 |
| 3,080,156 | 3/1963 | Freeman | 263—33 |

JOHN J. CAMBY, *Acting Primary Examiner.*